United States Patent [19]
Peltomaki

[11] 3,759,040
[45] Sept. 18, 1973

[54] DEVICE FOR BETTER EXPLOITATION OF THE EXHAUST ENERGY FROM AN INTERNAL COMBUSTION ENGINE

[76] Inventor: Olavi Peltomaki, Frilundintie 3, Vaskiluoto, Finland

[22] Filed: Oct. 1, 1971

[21] Appl. No.: 185,520

[30] Foreign Application Priority Data

Oct. 19, 1970  Sweden..........................14062/70

[52] U.S. Cl.................... 60/305, 60/13, 60/280, 60/308
[51] Int. Cl........................ F02b 75/10, F02b 37/04
[58] Field of Search.................... 60/280, 304, 305, 60/306, 308, 13

[56] References Cited
UNITED STATES PATENTS

| | | | |
|---|---|---|---|
| 2,295,436 | 9/1942 | Tendler | 60/305 |
| 2,583,651 | 1/1952 | Horning | 60/280 |
| 3,102,381 | 9/1963 | Tryhorn | 60/280 |
| 3,127,880 | 4/1964 | Meurer | 60/304 |
| 3,147,588 | 9/1964 | Tauschek | 60/305 |
| 3,232,044 | 2/1966 | Gratzmuller | 60/280 |
| 3,335,564 | 8/1967 | Hines | 60/306 |
| 3,385,053 | 5/1968 | Honda | 60/305 |

FOREIGN PATENTS OR APPLICATIONS 360,382   12/1931   Great Britain.................... 60/304

*Primary Examiner*—Douglas Hart
*Attorney*—Toren and McGeady

[57] ABSTRACT

A device for better exploitation of the exhaust gas energy from an internal combustion engine equipped with poppet valves, in particular for an exhaust gas driven compressor. Subsequent to a narrow continuation succeeding the sealing point of the valve seat an annular opening is provided, to which air is supplied at atmospheric pressure or under appropriate pressure, said opening as well as the upper surface of the valve and the inner surface of the valve seat being shaped so that here is formed an ejector, in which the exhaust gases flowing at high speed pick up air that has been supplied to the opening.

6 Claims, 3 Drawing Figures

DEVICE FOR BETTER EXPLOITATION OF THE EXHAUST ENERGY FROM AN INTERNAL COMBUSTION ENGINE

It is a well-known fact that the greatest chances to increase the efficiency of an internal combustion engine are to provide for the better exploitation of the exhaust energy. That is how matters stand especially in an engine equipped with a compressor booster; according to a reference an engine boosted by 2 atm pressure could give out 50 percent more power with unchanged fuel consumption if the entire expansion of the exhaust gases could be exploited. As a matter of fact one has begun to use the great surplus energy of the exhausts of compressor-boosted engines to an obvious purpose: to drive the compressor. The exhaust gases are conducted to a turbine, which then drives the compressor. With existing methods, however only a small part of the total energy of the exhaust gases can be utilized in the turbine. In compressor engines, the pressure at the moment when the exhaust valve is opening, amounts to 5–9 atm in the cylinder, and in the exhaust channel, immediately after the valve, a pressure of 0.8–1.4 atm abs prevails. In consequence of the high pressure difference, a flow is produced when the valve opens, between this valve and its seat, which is propagated at sonic velocity. Also after the gap a high overpressure prevails in the gas jet in relation to ambient space, and the gases expanding in all directions, causes strong turbulence and high frequency waves, when the potential energy of the exhaust gases is converted mostly to heat, of which a small part only can be utilized in the turbine. The pressures are only slowly equalized, and between 30 and 50 percent of the gas mass in the cylinder pass through the gap before the flow becomes subsonic and less associated with losses. The main part of the losses are due to the unfavourable flow conditions which arise between the valve and its seat when the valve opens. Another factor decreasing the exploitation of the exhaust energy is that the turbine itself has to operate under unfavourable conditions because of the periodicity of the energy flow.

From what precedes it will be seen that for the better exploitation of the exhaust energy, the flow which is produced at the opening of the valve, should be made to accomplish work and to change as early as possible to become a subsonic flow; moreover, in view to the turbine, it should be possible to smooth out the pulsating nature of the flow. In accordance with the present invention this is brought about in that after the narrow continuation succeeding the sealing point between the valve and its seat, an annular opening is provided, to which air is supplied from under atmospheric or appropriate gas pressure, the upper surface of the valve and the inner surface of the valve seat being shaped so that at this point an ejector is formed, in which the exhaust gases flowing at high speed pick up air that has been supplied to the opening. A substantial part of the kinetic energy of the exhaust gases will be absorbed by the air, the flow is slowed down, and with the rapid increase in quantity of the gases the back pressure in the exhaust channel will increase, whereby the flow in the exhaust gas jet becomes subsonic and the conversion of kinetic energy to heat as a result of turbulence and equivalent will decisively decrease. In order to achieve the best possible ejector effect, the gap between the valve and its seat is shaped in such a way that it is equivalent to a Laval nozzle when the moving valve is at the point of maximum potential energy flow. A great proportion of the pressure energy will be converted to kinetic energy and the exhaust gases pick up the largest possible quantity of air from the ejector. In addition to the fact that a device of this kind enables a considerable part of the supersonic energy of the exhaust gases to be utilized (which has not been possible formerly), the invention also affords several other notable advantages, of which a few shall be pointed out here:

The mass flow of the gases flowing into the turbine increases considerably, and with the correct use of a pressure equalizer the efficiency of the turbine can be improved.

The temperature of the gases arriving at the turbine decreases enabling a turbine of less expensive design to be used.

The cold air flow from the ejector cools the exhaust valve, and this has several useful consequences; in spark ignition engines the use of a higher compression ratio is possible, among other things.

The air admixed to the exhaust gases may be used for after-burning, which results in less polluting exhaust gases.

In the following, an embodiment of the invention is shown by the aid of drawings.

Figure 1:
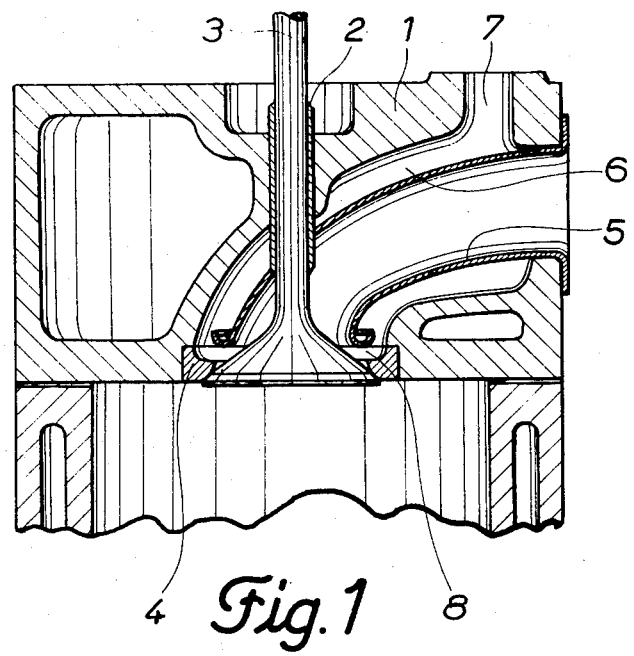
FIG. 1 shows a cylinder head in which an ejector in accordance with the invention has been provided.
Figure 2:
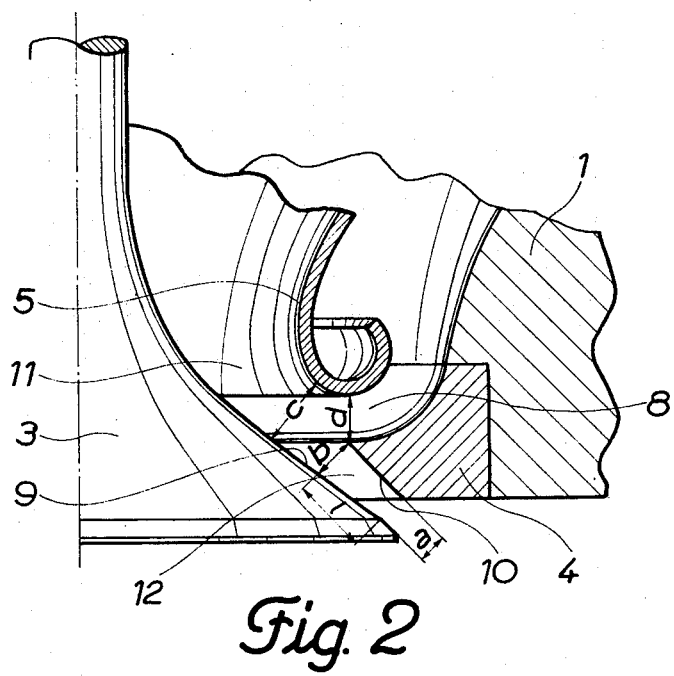
FIG. 2 shows the design of the ejector on a larger scale.

In FIG. 1 is shown the cylinder head 1 with exhaust valve 3 in the valve guide 2 in this head. The valve rests against the valve seat 4, the upper part and inner surface of which are have been specially shaped to bring about an appropriate ejector effect. In this design solution the supply of air to the eductor has been solved in that the exhaust duct has been made wider than normal and in it a pipe 5 has been mounted, which divides the duct into two parts: that is to say, into the exhaust duct proper, which is found within the pipe, and the annular duct 6 formed between the pipe and the cylinder head, and through which the air supplied through the opening 7 goes to the annular opening 8 of the ejector. Of course, the air might also be conducted to the opening through a duct of another kind, for example, through a duct made directly in the cylinder head, but the solution presented affords an important advantage. When the exhaust duct is insulated from the water cooling, the greatest possible proportion of the heat energy in the gases can be exploited in the turbine. The use of such a solution is rendered possible by the fact that, at all events, the exhaust gases are cooled by the cold accessory air to a temperature appropriate for the turbine. In FIG. 2 the shape of the ejector and of the Laval nozzle are shown in greater detail. The valve 3 has lifted a small distance and is in the position in which the energy transfer can be most efficiently exploited. The dimensions $a$, $b$ and $l$ for the nozzle formed between the upper surface 9 of the valve and the inner surface 10 of the seat can be determined, for example, in the following manner. At first, the engine speed and degree of loading are fixed at which the best efficiency of the energy transport from the exhaust gases to the turbine is desired. Thereafter, one calculates that valve lift under these conditions at which the highest potential energy flow prevails for the pressure conditions in the cylinder and in the exhaust duct. By means of these, more or less approximately estimated quantities, such dimensions can be calculated for the nozzle that the greatest possible part of the energy released will be converted to kinetic energy. The ultimate, suitable shape appropriate for any particular engine may, of course, only be found by means of thorough experimentation. The ejector is composed of the annular air port 8 between the pipe 5 and the upper surface of the seat 4 and of the ejector sleeve 11 between the pipe 5 and the valve 3, into which the exhaust gas flows in passing from the nozzle 12, thereby picking up air that has been supplied to the opening 8. To determine the dimensions c and d of the ejector by calculation is even more difficult than to find the nozzle dimensions, but by experimentation a suitable shape for each particular engine will always be found. With the calculated data, the device works as follows. Immediately after the exhaust valve has opened, and while the pressure difference is high, the gases flow through the Laval nozzle at a velocity of 2-3 Mach. The high speed gas flow picks up air in the ejector and a great part of the kinetic energy will be absorbed therein. While the exhaust gases draw in new gas into the exhaust duct, the back pressure in the duct simultaneously increases, the pressure difference is reduced and the flow speed becomes subsonic much more rapidly than would be the case without the eductor. While the flow is supersonic and the increased back pressure does not affect the mass flow, the efficiency of purging does not suffer either because of this function. After the admixture of air with the exhaust gases the gas flow, which has been cooled and has increased in quantity, continues in the direction towards the turbine. The exhaust duct may furthermore be shaped to be slightly conical in order to bring about a diffusor effect, whereby part of kinetic energy will be reconverted to pressure energy. It is obvious that the operation of the device is only optimal at the calculation point, but by considering the relationship between the shape of the ejector and the valve lift it is possible to assess that the efficiency of the device will be good both before the calculation point and thereafter, when the flow has already become subsonic.

Figure 3:
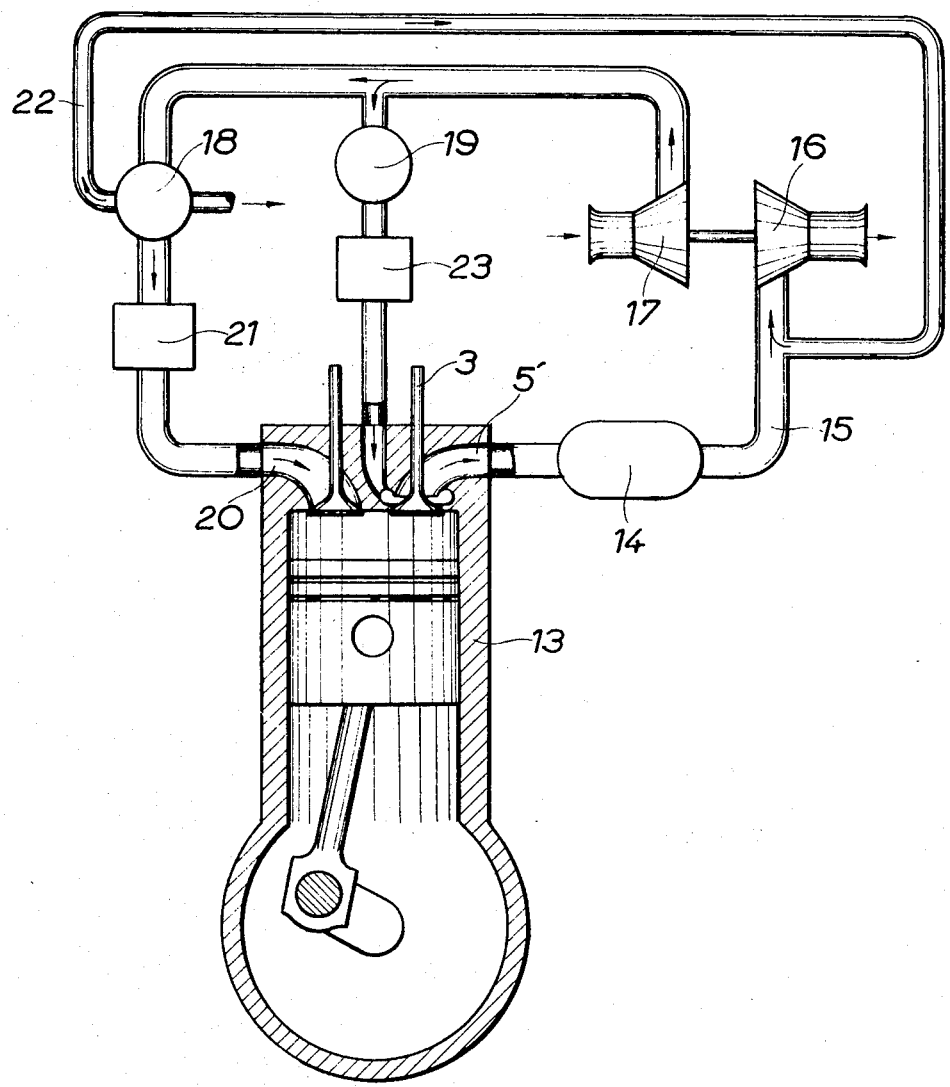
FIG. 3 is a schematical drawing showing the insertion of the ejector device in the purging system of an engine with exhaust gas turbocharger.

In FIG. 3 the placement of a device in accordance with the invention in the gas turnover system of an engine equipped with a turbocharger has been shown. When the engine 13 is running, the mixture of exhaust gases and air passes through the exhaust duct 5 to a pulse converter unit 14, that is, to an air tank or an equivalent device, which levels out the pulsating energy flow of the gases to become an even flow, and then by the duct 15 to the turbine 16. The turbine drives the compressor 17, from which the pressurized air goes to the regulators 18 and 19. The regulator 18 controls the amount of the air intake to the engine, and it is governed by the engine speed and loading. Before being conducted into the intake duct 20, the air goes through an intermediate cooler 21. The excess of air is conducted off to serve any particular useful purpose, or it is returned to the turbine through ducts 22 and 15. The air to the ejector can be taken directly from the atmosphere or, if pressurized air is required, through a regulator 19 from the air supplied by the compressor. This controller may be merely a constant pressure valve which reduces the pressure obtained from the compressor to a constant pressure suitable for the purpose, or it may be appropriate that the valve governs the pressure fed to the ejector, as a function of the engine speed and load. It is also conceivable that the pressure varies in accordance with the crankshaft angle, and consequently with the valve lift. Before introducing the air into the ejector, it may be useful to cool also this air, which has been heated in the compressor, in an intermediate cooler 23.

I claim:

1. In an internal combustion engine, a device for facilitating utilization of the exhaust gas energy, comprising means defining an exhaust passage, a poppet exhaust valve mounted in said exhaust passage, said exhaust valve having a seating surface, a valve seating member at the inlet of said exhaust passage, said seating member having a seating surface cooperable with said seating surface on said poppet valve to prevent flow of exhaust gases into said exhaust passage, said poppet valve and said seating member each having an annular surface, said annular surface on said poppet valve being disposed opposite said annular surface on said valve seating member, said two annular surfaces being inclined at different angles relative to the axis of said poppet valve for providing a gradually widening annular gap between said poppet valve and said valve seating member, a gas inlet passage means located outside of said exhaust passage and having an inlet opening which opens into said exhaust passage at said widening annular gap, whereby exhaust gases flowing through said widening gap between said poppet valve and valve seating member act in the manner of an ejector to draw in gases from said inlet opening of said gas inlet passage means into said exhaust passage.

2. In an internal combustion engine according to claim 1, wherein said annular surface on said poppet valve is contiguous to said seating surface on said poppet valve, said annular surface on said valve seating member being contiguous to said seating surface on said valve seating member.

3. In an internal combustion engine according to claim 2, wherein said two annular surfaces define a Laval nozzle.

4. In an internal combustion engine according to claim 2, wherein said two annular surfaces are frusto-conical surfaces with the cone angle of the frusto-conical surface on said poppet valve being greater than the cone angle of the frusto-conical surface on said valve seating member.

5. In an internal combustion engine according to claim 2, wherein said inlet opening is located at the widest part of said widening gap between said two annular surfaces.

6. In an internal combustion engine according to claim 3, wherein said exhaust gases pass over said inlet opening into an annular passage between said poppet valve and the inner wall of said exhaust passage, said annular passage having a greater transverse width than the transverse width of said inlet opening.

* * * * *